United States Patent
He et al.

(10) Patent No.: US 11,282,099 B2
(45) Date of Patent: Mar. 22, 2022

(54) PROBABILISTIC PRICE AND SPIKE FORECASTING

(71) Applicant: FUJITSU LIMITED, Kawasaki (JP)

(72) Inventors: Dawei He, San Jose, CA (US);
Wei-Peng Chen, Fremont, CA (US);
Rohisha Adke, Campbell, CA (US)

(73) Assignee: FUJITSU LIMITED, Kawasaki (JP)

( * ) Notice: Subject to any disclaimer, the term of this patent is extended or adjusted under 35 U.S.C. 154(b) by 797 days.

(21) Appl. No.: 15/043,384

(22) Filed: Feb. 12, 2016

(65) Prior Publication Data
US 2017/0236136 A1  Aug. 17, 2017

(51) Int. Cl.
*G06Q 30/02* (2012.01)
*G06N 20/00* (2019.01)
*G06N 7/00* (2006.01)

(52) U.S. Cl.
CPC ......... *G06Q 30/0206* (2013.01); *G06N 7/005* (2013.01); *G06N 20/00* (2019.01)

(58) Field of Classification Search
CPC ..... G06Q 30/0206; G06N 20/00; G06N 7/005
USPC ....................................................... 705/7.31
See application file for complete search history.

(56) References Cited

U.S. PATENT DOCUMENTS

| | | | |
|---|---|---|---|
| 9,605,704 B1 * | 3/2017 | Humphries | G06Q 20/102 |
| 2008/0208663 A1 * | 8/2008 | Walker | G06Q 10/0637 |
| | | | 705/7.36 |
| 2012/0303412 A1 * | 11/2012 | Etzioni | G06Q 30/06 |
| | | | 705/7.31 |

FOREIGN PATENT DOCUMENTS

EP  2 899 673 A1  7/2015

OTHER PUBLICATIONS

Clements, et al., Semi-parametric Forecasting of Spikes in Electricity Prices (2012) (Year: 2012).*
Mei, et al., A Random Forest Method for Real-Time Price Forecasting in New York Electricity Market (2014) (Year: 2014).*
EP Examination Report in application No. 16 207 298.7 dated Sep. 10, 2018.
European Search Report issued in corresponding application No. 16 20 7298, dated May 11, 2017.
R., Weron. "Electricity price forecasting: A review of the state-of-the-art with a look into the future." International Journal of Forecasting 30 (2014):1030-1081.

(Continued)

*Primary Examiner* — Charles Guiliano
(74) *Attorney, Agent, or Firm* — Maschoff Brennan (57) ABSTRACT

A method to forecast a spike price of a commodity may include obtaining a request to perform a prediction of a spike in a price of a commodity. The method may also include obtaining additional information of the commodity based on the input. The method may also include determining, using a first machine learning algorithm, a probability of the spike based at least in part on the additional information. The method may include outputting the probability of the spike for visual representation on an electronic display in response to a determination that the probability of the spike is above a risk tolerance. The method may further include determining, using a second machine learning algorithm, a price prediction in response to a determination that the probability of the spike is below the risk tolerance, wherein determining the price prediction comprises outputting the price prediction for visual representation on the electronic display.

20 Claims, 6 Drawing Sheets

(56) References Cited

OTHER PUBLICATIONS

S. Voronin, J. Partanen. "Price Forecasting in the Day-Ahead Energy Market by an Iterative Method with Separate Normal Price and Price Spike Frameworks." Energies, 6 (2013): 5897-5920.
Y. Ji, R. Thomas, L. Tong. "Probabilistic Forecast of Real-Time LMP via Multiparametric Programming." 48th International Conference on System Sciences (2015).
K. Maciejowska, J. Nowotarski. "A hybrid model for GEFCom2014 probabilistic electricity price forecasting." HSC Research Report (2016).
J. Smolen, Z. Chen. "Analysis of price peaks on Danish electricity market." IEEE, May 10, 2012.
R. Hyndman, S. Fan. "Density Forecasting for Long-Term Peak Electricity Demand." IEEE Transactions on Power Systems, vol. 25, No. 2 (2010): 1142-1150.
R. Koenker. Quantile Regression. New York: Cambridge University Press, 2005. Adobe Digital Editions. Web. Nov. 1, 2015.
N. Amjady, F. Keynia. "A new prediction strategy for price spike forecasting of day-ahead electricity markets." Applied Soft Computing, 11 (2011): 4246-4256.
A. Clements, J. Fuller, A. Hum. "Semi-parametric forecasting of Spikes in Electricity Prices." NCER Working Paper Series (2012).
L. Breiman. "Random Forests." Machine Learning, 45 (2001): 5-32.
T. Hastie, R. Tibshirani, J. Friedman. The Elements of Statistical Learning (2nd ed.). New York: Springer Series in Statistics, 2009. Web. Oct. 2015.
R. Koenker, K. Hallock. "Quantile Regression." Journal of Economic Perspectives, vol. 15, No. 4 (2001): 143-156.
EP Summons to attend oral proceedings in application No. 16207298.7 dated Jan. 31, 2019.
EP Oral Proceedings in application No. 16207298.7 dated Aug. 27, 2019.

* cited by examiner

PROBABILISTIC PRICE AND SPIKE FORECASTING

FIELD

The present disclosure relates to probabilistic price and spike forecasting.

BACKGROUND

Price forecasting in commodities, such as electricity, has become increasingly important. Price forecasting may range from long-term to short-term forecasting. Long-term and medium-term price forecasting may be used for investment and maintenance objectives. Short-term, such as real-time, forecasting may be used for operation purposes by market operators of the commodity and generators of the commodity. For example, generators of electricity may use real-time price forecasting to determine when and how much to bid for supplying electricity to a marketplace. Others may also use real-time price forecasting for electricity. For instance, retailers and demand response aggregators may use real-time forecasting when determining how to integrate smaller consumers into demand response strategies.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method to forecast a spike price of a commodity may include obtaining a request to perform a prediction of a spike in a price of a commodity. The method may also include obtaining additional information of the commodity based on the input. The method may also include determining, using a first machine learning algorithm, a probability of the spike based at least in part on the additional information. The method may also include outputting the probability of the spike for visual representation on an electronic display in response to a determination that the probability of the spike is above a risk tolerance. The method may further include determining, using a second machine learning algorithm, a price prediction in response to a determination that the probability of the spike is below the risk tolerance, wherein determining the price prediction comprises outputting the price prediction for visual representation on the electronic display.

The object and advantages of the embodiments will be realized and achieved at least by the elements, features, and combinations particularly pointed out in the claims.

It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described in this application relate to a system and method to forecast a price and/or a price spike of a commodity, such as electricity, oil, gas, water, among other commodities. In some circumstances, a commodity market may exist for buying and selling a commodity. The time between the bidding and clearing process may be relatively short, for example every 5, 10, 15, 30, or 60 minutes or some other interval of time. In these and other embodiments, clearing and bidding processes that occur in approximately 60 minutes or less may be referred to herein as real-time pricing of the commodity. Due to recent changes in technology that allow for the real-time pricing of commodities, buyers and sellers may submit bidding prices in real-time.

Typically, prices of commodities may be volatile and contain price spikes. Price spikes may include instances where the price of the commodity moves in a comparatively large upward or downward trend in a short period of time. For example, in some circumstances, clearing and bidding process for electricity may occur every five minutes. In these and other embodiments, the price may be $100 per megawatt hour (Mwh) at time A and five minutes later at time B, the price may be $300/Mwh. The change of the price between time A and time B may be referred to as a price spike. Further, some prices of commodities may vary by region. For example, electricity demand may be specific to a particular market, country, system and/or locale. Due to the volatility in the prices of commodities, it may be very difficult to submit selling and bidding prices within a proper risk tolerance in real-time and/or for a particular region. Further, conventional systems typically may not predict spikes and spike prices because the conventional systems typically predict prices based on cyclical patterns and spikes and spike prices often do not follow a cyclical pattern.

To help buyers and sellers manage risk when submitting prices and bids for a commodity, the system and method described in at least some embodiments in this application forecast a price and/or a price spike of a commodity at a particular future time. The buyers and sellers may also use the system and method described to determine a risk tolerance and spike level threshold. Due to the volatile and price spikes of commodity prices, the system and method described in at least some embodiments in this application apply past price and demand data to forecast a price and/or a price spike of a commodity at a particular future time.

The system and method described may include price spike and probabilistic price forecasting for a specific location and time. An example algorithm may provide forecasting of price spike likelihood for each five-minute interval during an hour period, where the hour period is three hours ahead of a first interval. Another example algorithm may provide forecasting of price spike likelihood for each hour, three hours ahead of the first hour. A further example algorithm may provide non-spike price forecasting for each five-minute interval during an hour period, where the hour period is three hours ahead of the first interval. Yet another example algorithm may provide probabilistic and point price predictions for each five-minute interval during an hour period, where the hour period is three hours ahead of the first interval.

The system and method described may use random forest and quantile regression on historical load, price, and time/date/location features, up to a year ahead of the point of prediction, to build a predictive model. The combination of methods allows the use of the strengths of both a flexible ensemble of decision trees to predict seemingly unpredictable price spikes, as well as time-series regression, which may take advantage of the underlying structure of the non-spike pricing data.

In addition to predicting commodity prices, the described methods and systems may be applied to other areas, such as in prediction in fields with volatile time-series data with costly spikes, demands, loads, store inventories, financial data, holiday schedules, markets in which participants may have fixed or varying operating costs, or sell/buy points, and in prediction in other (emerging) energy markets, among others. Embodiments of the present disclosure will be explained with reference to the accompanying drawings.

Figure 1:
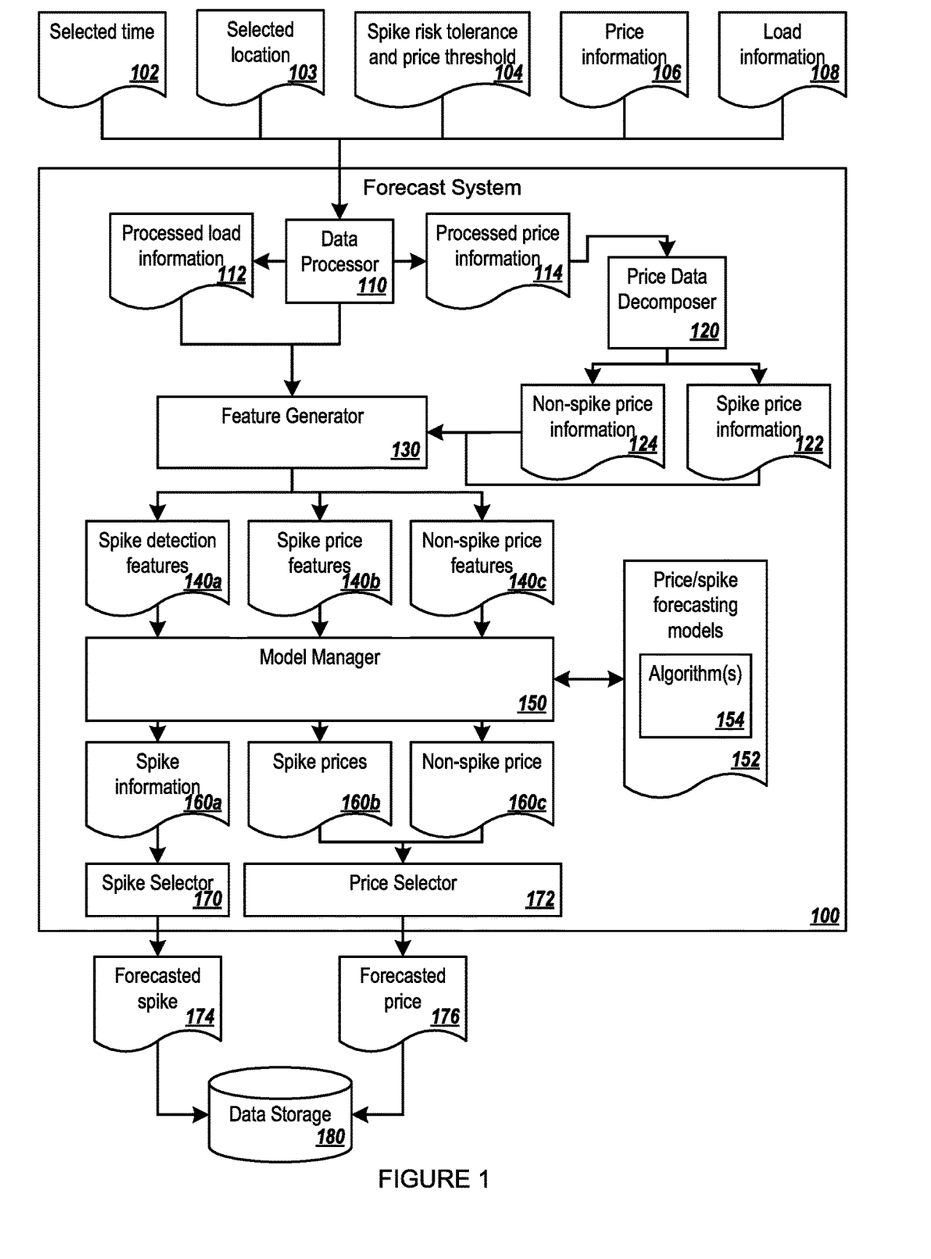
FIG. 1 illustrates an example forecast system to forecast price and/or a price spike of a commodity.

FIG. 1 illustrates an example forecast system 100 to forecast price and/or a price spike of a commodity, arranged in accordance with at least one embodiment of the present disclosure. The forecast system 100 may forecast price and/or a price spike of a commodity at a future time based on price information and load information for the commodity. In general, the forecast system 100 may forecast price and/or a price spike of a commodity using one or more models. For example, a model for predicting price and/or a price spike may include a random forest model or a quantile regression model, among others. For example, the forecast system 100 may include hardware, software, or both hardware and software used to perform the methods illustrated in FIGS. 2 and 4.

To forecast a price and/or a price spike of the commodity, the forecast system 100 may obtain a particular time in the future 102 and a location 103 for which the price and/or a price spike of the commodity is to be forecasted. In some embodiments, the time 102 and location 103 may be provided automatically by another system that is requesting the forecast price and/or a price spike or by a user of the forecast system 100 or communicating with the forecast system 100. In some embodiments, the forecast system 100 may obtain the time 102 based on the time of the request to forecast a price and/or a price spike. For example, in some embodiments, the forecast system 100 may forecast a price and/or a price spike at a particular time ahead of when a request is received. The location 103 may be any physical geographic location, region or area, such as a state, county, district, an area covered by a particular utility provider, etc. In some embodiments, the forecast system 100 may obtain the location 103 based on a geographical location of a user and/or a user device requesting to forecast the price and/or the price spike of the commodity. The geographic location may be obtained via a GPS or other device. In some alternative embodiments, the forecast system 100 may obtain the location 103 from a user of the forecast system 100.

The time 102 may be a single time in the future or may be multiple times in the future. The forecast system 100 is described with respect to FIG. 1 with respect to a single time in the future. However, the forecast system 100 may operate to forecast prices at multiple times by performing multiple iterations. In some embodiments, some data used or generated in one iteration may be used in additional iterations.

In some embodiments, the time 102 may have a granularity associated with a time granularity of bidding and selling on a commodity market of the commodity. For example, the commodity market for electricity sells and buys electricity at five (5) minute intervals. In these and other embodiments, the time 102 obtained may correspond to the intervals of the commodity market of the commodity. Alternately or additionally, the forecast system 100 may obtain any time and may process the time such that it corresponds with the time intervals of the commodity market of the commodity, such as for every hour, for five minute intervals within an hour, etc.

The forecast system 100 may also obtain spike risk tolerance and spike price threshold information 104. The forecast system 100 may obtain the spike risk tolerance from a user of the forecast system 100. The spike risk tolerance may include one or more alphanumeric values that may be indicative of a particular risk tolerance of the user. In at least one embodiment, the spike risk tolerance may be a predetermined value. The spike price threshold may be determined based on the stability of the price of the commodity. For example, the spike price threshold may be set at a value such that eighty (80) percent of the prices of the commodity within a given time frame are lower than the spike price threshold. In some embodiments, commodity markets with higher price stability may have a higher percent of prices within a given time frame that are lower than the spike price threshold than commodity markets with lower price stability. Alternately or additionally, the spike price threshold may be variable as the stability of the price may vary over time. For example, electricity stability may be different during spring than during summer. In some embodiments, the spike price threshold may be determined based on a knee point of a frequency of the prices in the commodity market.

Based on the time 102 and location 103, the forecast system 100 may obtain data regarding the price and load of the commodity. In some embodiments, price information 106 may be obtained about the commodity. Alternately or additionally, load information 108 may be obtained about the commodity. In some embodiments, the price information 106 and the load information 108 may be obtained from the commodity market that handles the selling and buying of the commodity.

In some embodiments, the price information 106 may include multiple different types of price information. The different types of the price information 106 may include first and second previous price data. For example, in some embodiments, the first previous price data may be actual price data of a first period that is a first time before the time 102 and the second previous price data may be actual price data of a second period that is a second time before the time 102. In some embodiments, the first and second previous price data may provide price data for multiple buying and selling periods of the commodity market. In some embodiments, the price information 106 may include a difference between the first and second previous price data.

In some embodiments, the first period may be a period within a few hours of the time 102 to capture current price data trends of the commodity. In some embodiments, the first period may be a period associated with the latest real-time price data of the commodity. The second period may be a period during the same time of day as the time 102 but during a previous day. The second period may assist the forecast system 100 in determining common price trends for the commodity during common hours of the day. For example, electricity prices during the noon hour a day before may be more representative of electricity prices during the noon hour of the current day than electricity prices between 2 and 3 A.M. the day before.

As an example of the first and second periods, when the commodity market buys and sells every five (5) minutes, the first period may be one hour that spans from two hours to one hour before the time 102. The second period may also be one hour that spans from twenty-four hours to twenty-three hours before the time 102. For example, if the time 102 is 12:05 P.M. on April 14, the first previous price data may be 12 equally spaced data points of actual price data of the commodity from 10:05 A.M. to 11:05 A.M. on April 14. The second previous price data may be 12 equally or unequally spaced data points of actual price data of the commodity from 12:05 P.M. to 1:05 P.M. on April 13. In some embodiments, the first and second periods may be different lengths.

Another type of price information 106 may include a future market clearing price. A future market clearing price may be a predicted price of the commodity at a lower granularity than the requested forecast price and the timing for bidding and clearing of the commodity. For example, the commodity market may accept bids and clear the commodity every 5 minutes. The future market clearing price may provide an estimated price for every hour on the hour. Thus, the future market clearing price may provide an estimate for one or every twelve buying and clearing periods.

In some embodiments, the load information 108 may include multiple different types of load information. The different types of the load information 108 may include previous load data and forecasted load data. In some embodiments, the previous load data may be the actual load data of a load period that is before the time 102. The load period of the previous load data may assist the forecast system 100 in determining current load trends of the commodity. In some embodiments, the load information 108 may include a difference between the previous load data and the forecasted load data.

As an example of the load period when the commodity market buys and sells every 5 minutes, the load period may be one hour that spans from two hours to one hour before the time 102. For example, if the time 102 is 12:05 P.M. on April 14, the previous load data may be 12 equally or unequally spaced data points of actual load data of the commodity from 10:05 A.M. to 11:05 A.M. on April 14.

A forecasted load data may be a predicted load of the commodity at a lower granularity than the requested forecast price and the timing for bidding and clearing of the commodity. For example, the commodity market may accept bids and clear the commodity every 5 minutes and provide load information every 5 minutes. The forecasted load data may provide an estimated load for every hour on the hour. Thus, the forecasted load data may provide an estimate for one or every twelve bidding and clearing periods.

The forecast system 100 may include a data processor 110 to process the price information 106 and the load information 108. The data processor 110 may remove bad data and interpolate missing data from the price information 106 and the load information 108. For example, the load information 108 may include load points that indicate that the load is zero. These load points may be replaced with adjusted load values that are interpolated based on neighboring load points. As another example, the price information 106 may include price points that are below zero or zero. These price points may be replaced with adjusted price values that are interpolated based on neighboring price points. The data processor 110 may generate processed load information 112 and processed price information 114.

The forecast system 100 may include a price data decomposer 120 to determine spike price information 122 and non-spike price information 124 from the processed price information 114. The price data decomposer 120 may identify and remove price spikes from the processed price information 114. In at least one embodiment, price spikes of the processed price information 114 may be identified based on the spike risk tolerance and/or spike price threshold 104.

To determine the non-spike price information 124, the identified price spikes from the processed price information 114 may be removed. Removing the identified price spikes may include changing the price value of the identified price spikes to an interpolated value based on neighboring non-spike price values.

To determine the spike price information 122, the identified price spikes from the processed price information 114 may be reduced with the interpolated value for the identified price spikes that replace the price spikes in the non-spike price information 124. Non-spikes prices may be removed. As a result, the spike price information 122 may include the identified prices spikes with the adjusted values.

The price data decomposer 120 may individually determine spike price information 122 and non-spike price information 124 for each of the different types of price information. Thus, the first previous price data may be decomposed based on the first previous price data. The second previous price data may be decomposed based on the second previous price data and the future market clearing price may be decomposed based on the future market clearing price.

In some embodiments, the price data decomposer 120 may determine the processed price information 114 using a moving-average filter of prices values with a rolling window that compares the spike price threshold. In these and other embodiments, the rolling window size may be based on an average length of spike events. In some embodiments, the rolling window size for a commodity market that includes bidding and clearing price points that occur every five (5) minutes may include three (3) to six (6) price points. In these and other embodiments, a moving-average filter may be applied to the non-spike price information 124 after the price spikes have been removed to smooth the prices in the non-spike price information 124.

The forecast system 100 may include a feature generator 130. After the non-spike price information 124 and the spike price information 122 is determined, the feature generator 130 may perform feature generation using the processed load information 112, the processed price information 114, the spike price information 122, and the non-spike price information 124. The features generated by the feature generation 130 may include spike detection features 140a, spike price features 140b, and non-spike price features 140c, collectively referred to in the current disclosure as the features 140. Other features 140 may include a day of a week, season, month, day, year, location, hour, minute, derivatives of a smoothed load, price variables, day-ahead price, a difference between forecast and actual loads, prices, number of spikes in an hour, whether or not there are spikes in lagged hours, minimum and maximum temperature at the location, largest absolute deviation in temperature at the location, real-time loads, load forecasts, lagged values of price, load, and spike variables (values three hours ago, at the same time one day prior, at the same time one week prior, and during the same month and season last year), quantile values during the same month last year, spike statistics and frequency during the same month last year, among other features.

The spike detection features 140*a* may be generated using the processed price information 114 and the processed load information 112. The spike price features 140*b* may be generated using the processed load information 112 and the spike price information 122 without using the non-spike price information 124 or the processed price information 114. The non-spike price feature 140*c* may be generated using the processed load information 112 and the non-spike price information 124 without using the spike price information 122 or the processed price information 114.

In some embodiments, the spike detection features 140*a*, the spike price features 140*b*, and the non-spike price features 140*c* may include similar features or non-similar features. Various features that may be included in the spike detection features 140*a*, the spike price features 140*b*, and the non-spike price features 140*c* are now described. The discussion that follows regarding the various features refers generally to price data. The price data may represent the processed price information 114, the spike price information 122, and the non-spike price information 124. For example, if the discussed features are the non-spike price features 140*c*, then the price data may represent the non-spike price information 124.

The features 140 generated by the feature generator 130 may include a spike feature, a load feature, a comparison load feature, a seasonal feature, a type of day feature, a hourly price variance feature, a price data feature, a demand price ratio feature, an elastic feature, and a spike series length feature, among other features.

The spike feature may indicate if a spike occurred in the first previous price data. The load feature may include a normalization of the previous load data of the load information 108. A generic normalization equation may be applied when generating the features 140. The generic normalization equation may normalize the data by taking a difference between a value of a data point at a time t and a lowest value in the data set and dividing the difference by a difference between a maximum value and the lowest value in the data set. The result is used to replace the value of the data point at time t such that the data point at time t is normalized.

The comparison load feature may be a difference between normalized forecasted load data and normalized previous load data. The seasonal feature may be a number that indicates a season, such as spring (March to May), summer (June to August), fall (September to November), and winter (December to February), of the day for the forecasted price being generated. The seasonal feature may be used when training data that is used to generate algorithms, such as a spike detection algorithm 154*a*, spike price algorithms 154*b*, and a non-spike price algorithm 154*c* that may use the features as inputs and include data from multiple different seasons. If the training data included information from a single season or the commodity's price does not vary based on a season, then the seasonal feature may not be used.

The type of day feature may be a number that indicates if the day for the forecasted price being generated is a weekday or a weekend. The day feature may be used when training data used to generate algorithms, such as a spike detection algorithm 154*a*, spike price algorithms 154*b*, and a non-spike price algorithm 154*c* that may use the features as inputs, include data from every day of the week. If the training data includes information from weekend or weekdays but not both or the commodity's price does not vary based on a whether it is a weekend or weekday, then the day feature may not be used.

The hourly price variance feature may be a number that represents a variation of the first previous price data. The price data feature may include a normalization of the one or more of a first and second previous price data and the future market clearing price.

The demand price ratio feature may include a comparison between the previous load data and the first previous price data after the previous load data and the first previous price data are normalized. The elastic feature may include a comparison between a change over time of the previous load data and a change over time of the first previous price data after the previous load data and the first previous price data are normalized. The spike series length feature may describe the number of consecutive price points that are price spikes. In some embodiments, the spike series length feature may be a number that is one less than the number of consecutive price points that are price spikes from the first previous price data.

In some embodiments, each of the spike detection features 140*a*, the spike price features 140*b*, and the non-spike price features 140*c* may include all of the features described in this disclosure among other features generated using the particular price data for that feature group. Alternately or additionally, each of the spike detection features 140*a*, the spike price features 140*b*, and the non-spike price features 140*c* may include one or more of the features described in this disclosure among other features generated using the particular price data for that feature group.

For example, in some embodiments, the spike detection features 140*a* may include the spike feature, the load feature, the comparison load feature, the seasonal feature, the type of day feature, the hourly price variance feature, the price data feature, and the spike series length feature. These features may be generated using the processed price information 114 that includes the price spikes.

In these and other embodiments, the spike price features 140*b* may include the spike feature, the comparison load feature, the price data feature, the demand price ratio feature, and the spike series length feature. These features may be generated using the spike price information 122 and not using the non-spike price information 124 or the processed price information 114.

In these and other embodiments, the non-spike price features 140*c* may include the load feature, the comparison load feature, the seasonal feature, the type of day feature, the hourly price variance feature, the price data feature, the demand price ratio feature, and the elastic feature. These features may be generated using the non-spike price information 124 and not using the spike price information 122 or the processed price information 114. The spike detection features 140*a*, spike price features 140*b*, and the non-spike price features 140*c* may be provided to the model manager 150.

The model manager 150 may create, train, and execute one or more models 152 for price and spike forecasting. Example models 152 may include a time-based (e.g., 5 minute, one hour) spike prediction random forest model and a time-series quantile regression model. A model 152 may include one or more algorithms 154. For example, the model manager 150 may create and train one or more algorithms 154 that may be used in a price model and/or spike model. Example algorithms 154 may include a spike detection algorithm, spike price algorithm, and a non-spike price algorithm.

The model manager 150 may generate and/or train models 152 such as by using machine learning algorithms using the price information 106 and the load information 108. In some embodiments, the models 152 may each result from the same type of machine learning algorithms and may each be trained with similar or different data. In some embodiments, the models 152 may each result from different types of machine learning algorithms. For example, a random forest model may result from a binary classification machine learning algorithm, or using an aggregated "spike hour" variable as a predicted value. The quantile regression model may result from a binary classification machine learning algorithm or by using a real-time price as a predicted value. The models may be trained using some or all of the data available to the model manager 150. Data used to train a model may be referred to as "training data." Training data may include previous price and load information about the commodity. For example, the training data may include previous real-time price information, previous future market clearing prices, previous real-time load prices, and previous forecasted load prices, etc.

In these and other embodiments, the training data used to develop each of the models 152 may be different. For example, the training data may include multiple features based on load information and previous spike-price information of the commodity. To develop each of the models 152, a different subset of the multiple features and/or different initial training parameters may be provided to the clustering algorithm to develop each one of the models 152. Thus, each of the models 152 may be similar but different enough to generate a probabilistic array of outputs with the same inputs. In some embodiments, the training data may be updated or added to at particular intervals, such as daily, weekly, bi-weekly, monthly, etc. After a change in the training data, the models 152 may be retrained with the updated training data.

During execution of one or more models, any of the features 140 may be provided to the model manager 150 as input. The model manager 150 may provide any of the features 140 to an algorithm 154 in the model 152. For example, the model manager 150 may provide spike detection features to a spike detection algorithm, spike price features to spike price algorithms, and non-spike price features to non-spike price algorithms. A spike detection algorithm may generate spike information 160a. The spike information 160a may indicate if a price spike is forecasted to occur or not to occur at the time 102. In some embodiments, the spike information 160a may be binary and thus may forecast a price spike or no price spike. Alternately or additionally, the spike information 160a may provide a probability for an occurrence of the price spike at the time 102. The model manager 150 may use provided spike price features 140b to a spike price algorithm to generate the spike prices 160b. The model manager 150 may use non-spike price features 140c in a non-spike price algorithm 154c to generate a non-spike price 160c.

The forecast system 100 may include a spike selector 170 to determine a forecasted spike 174 based on the spike information 160a. The forecast system 100 may include a price selector 172 to determine a forecasted price 176 of the commodity at the time 102 based on the spike prices and non-spike prices 160. When the spike selector 170 does not forecast a price spike at the time 102, the price selector 172 may select the non-spike price 160c as the forecasted price 176 of the commodity at the time 102. When the spike selector 170 forecasts a price spike at the time 102, the forecasted price 176 of the commodity at the time 102 may be based on the spike prices 160b. In some embodiments, the price selector 172 may determine the forecasted price 176 of the commodity at the time 102 based on the spike prices 160b by determining a mean or median of two or more of the spike prices 160b.

The forecast system 100 may store various data in a data storage 180. The data storage 180 may be used to store the time 102, location 103, spike risk tolerance and price threshold 104, processed load information 112, processed price information 114, spike price information 122, non-spike price information 124, features 140, algorithms 154, spike information 160a, spike prices 160b, non-spike prices 160c, forecasted spike 174 and forecasted price 176. In at least one embodiment, the data storage 180 may include a memory (e.g., random access memory), a cache, a drive (e.g., a hard drive), a flash drive, a database system, or another type of component or device capable of storing data. The data storage 180 may also include multiple storage components (e.g., multiple drives or multiple databases) that may span multiple computing devices (e.g., multiple server computers). The data storage 180 may be implemented within the forecast system 100. Alternatively, the data storage 180 may be external to the forecast system 100 and communicatively coupled to the forecast system 100 via a data link, such as a wired or wireless connection. The data storage 180 may be configured to store price information 106 and load information 108. In some embodiments, the price information 106 and load information 108 may be provided to the data storage 180 by a commodity market of the commodity. Upon request from another system, the data storage 180 may be configured to provide the price information 106 and load information 108 over a network (not illustrated).

Figure 2:
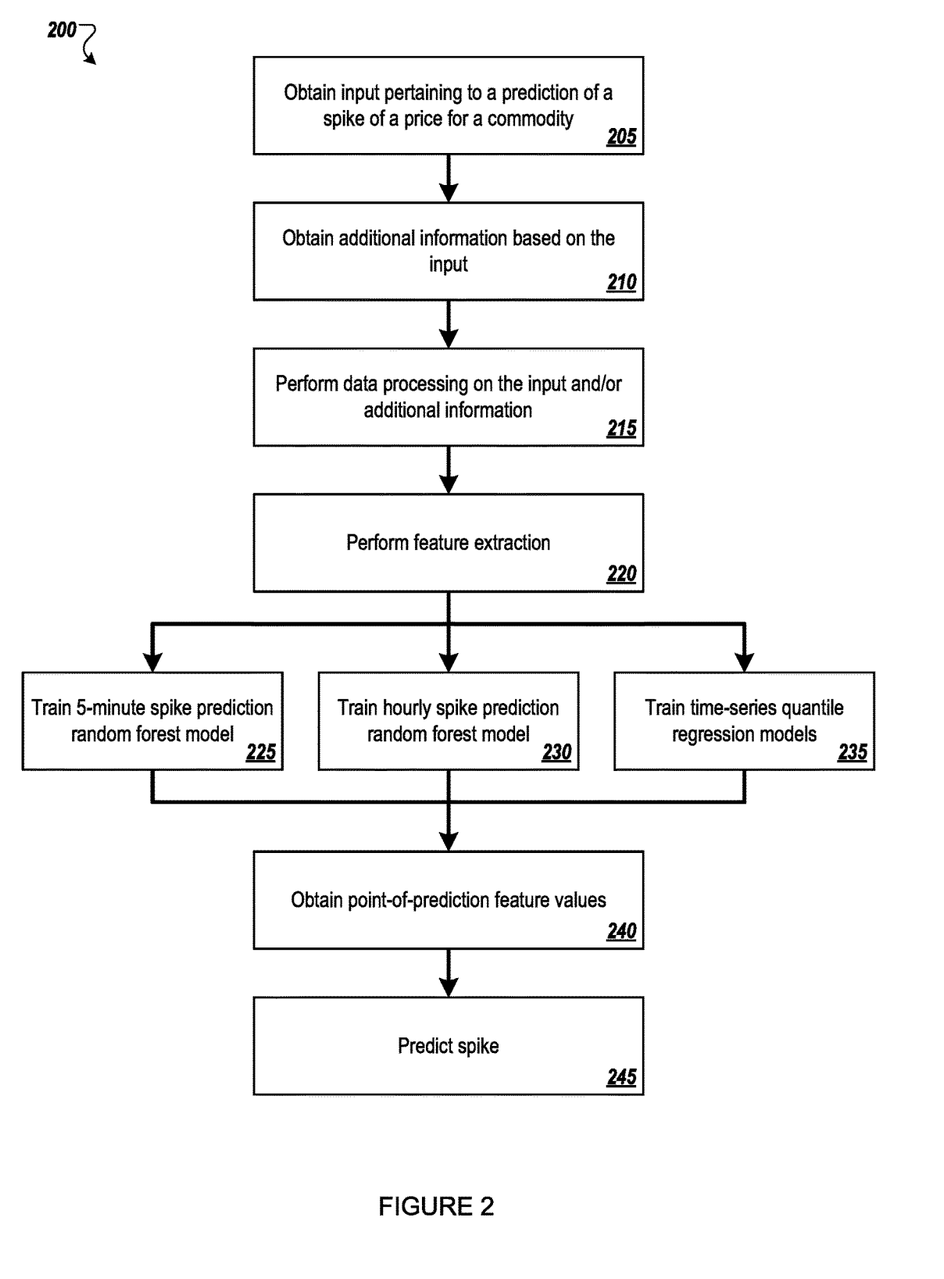
FIG. 2 illustrates a flow diagram of an example method of forecasting a spike price of a commodity.
Figure 3:
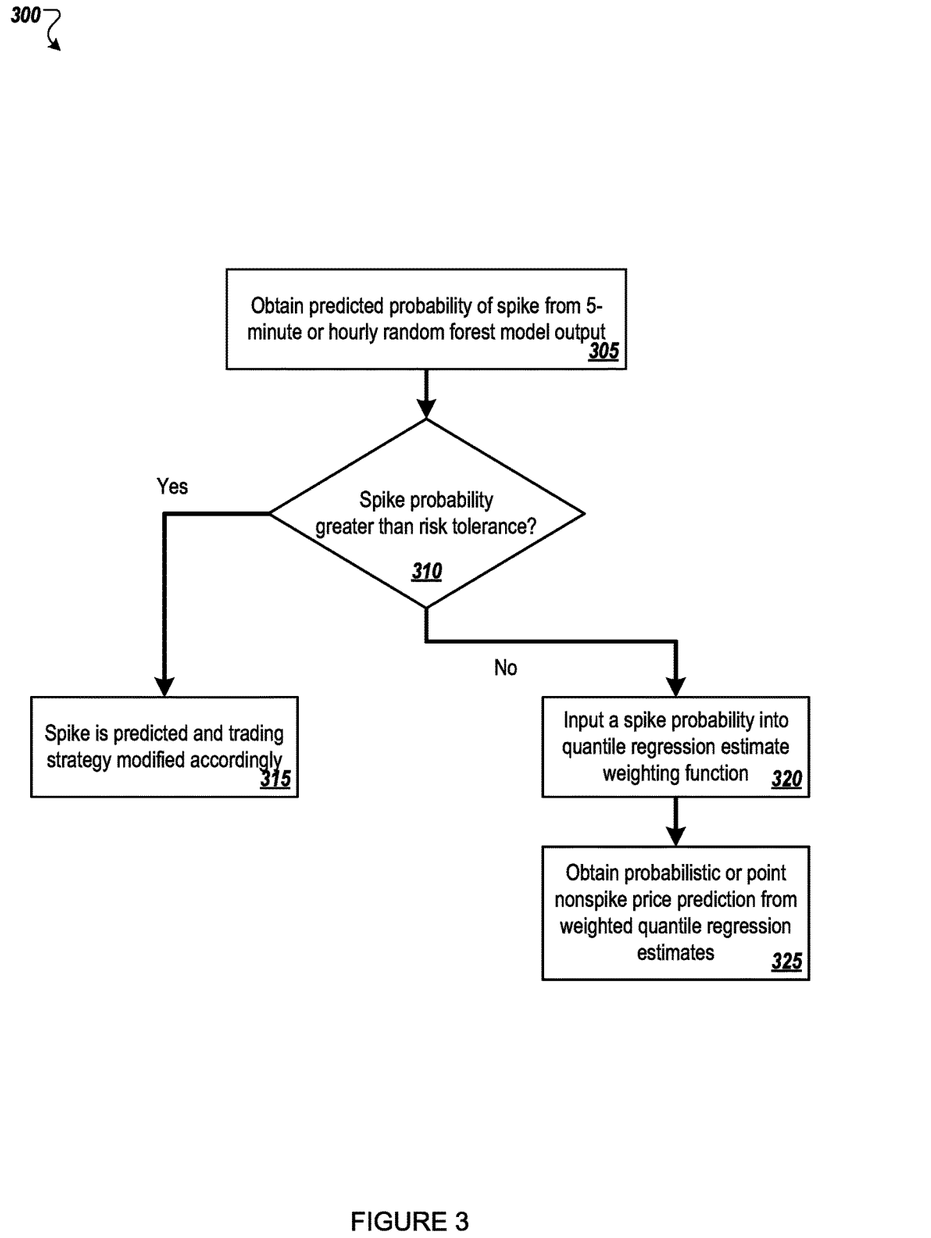
FIG. 3 illustrates a flow diagram of another example method of forecasting a spike price of a commodity.
Figure 4:
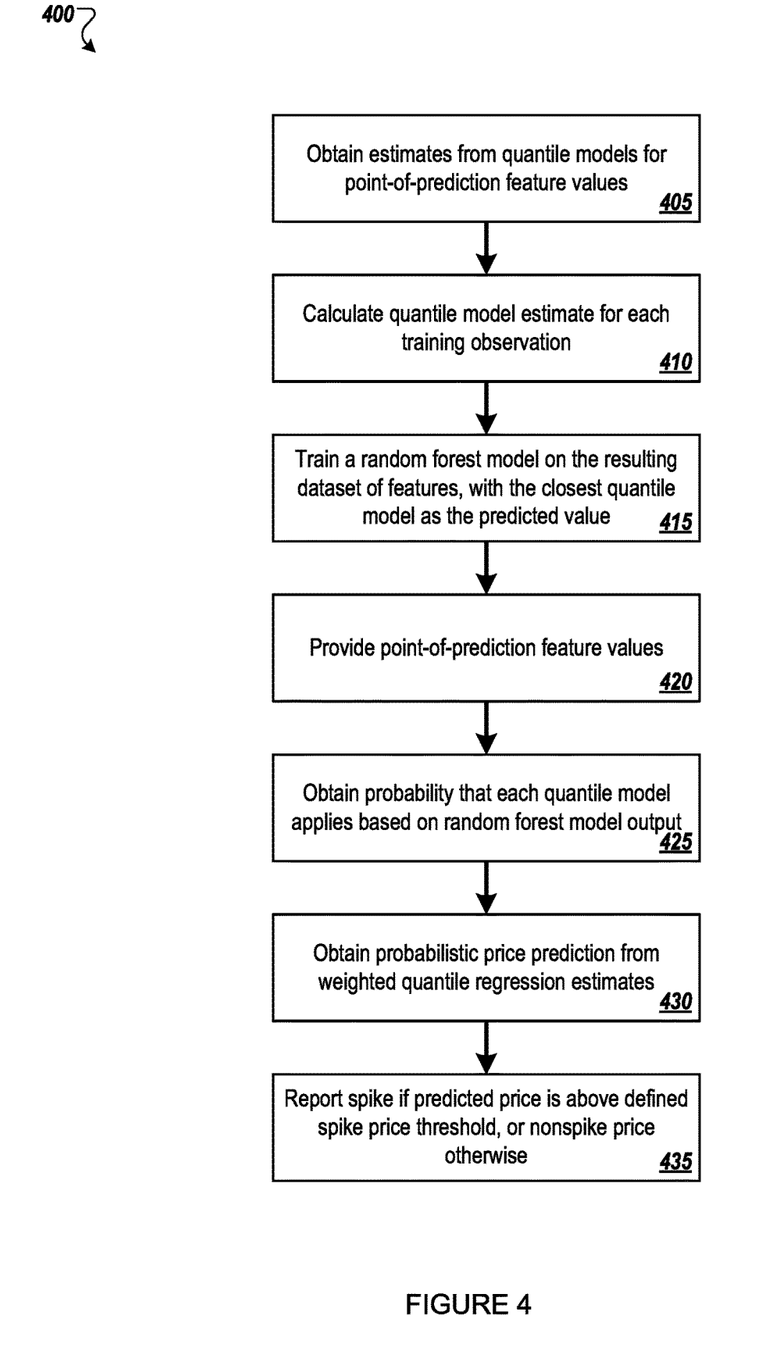
FIG. 4 illustrates a flow diagram of a further example method of forecasting a spike price of a commodity.

FIGS. 2-4 illustrate flow diagrams of example methods related to forecasting price and/or a spike price of a commodity. The methods may be performed by processing logic that may include hardware (circuitry, dedicated logic, etc.), software (such as is run on a general purpose computer system or a dedicated machine), or a combination of both, which processing logic may be included in the forecasting system 100 of FIG. 1, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 2 illustrates a flow diagram of an example method 200 of forecasting a spike price of a commodity. The method 200 may begin at block 205, where processing logic may obtain input pertaining to a prediction of a spike price for a commodity. The input may include a particular time in the future, a location, a spike risk tolerance, and/or a spike price threshold. The input may be provided from a user, a system, randomly generated, a combination thereof, or otherwise obtained.

At block 210, the processing logic may obtain additional information based on the input that may be used to determine the prediction of the spike price for the commodity. The additional information may include historical and day-ahead data, real-time loads, prices, and/or weather data, among others. The processing logic may use some of all of the input obtained at block 205 to obtain the additional information. For example, the processing logic may use time and location to obtain historical data and load data for a particular region.

At block 215, the processing logic may perform data processing on the input and/or the additional information. For example, the processing logic may preprocess and standardize some or all of the input and/or the additional information. For example, the processing logic may remove duplicate data, and may reformat and/or clean the input and/or the additional information for use in price spike prediction.

At block 220, the processing logic may perform feature extraction. In at least one embodiment, the processing logic may extract one or more features from the input and/or additional information. A feature may include any of the features 140 as further described in conjunction with FIG. 1. The processing logic may extract features using permutations of a raw dataset (e.g., the input and/or additional information). The processing logic, for example, may extract features for a particular time and/or location. For example, the time may be one hour and the processing logic may observe for price spikes during that one hour. The processing logic may use a spike price threshold to determine whether an observation represents a spike. The processing logic may aggregate the number of spikes that occurred during that observation's hour. In at least one embodiment, the processing logic may obtain lagged values of variables to receive historical information. In at least one embodiment, the processing logic may calculate a difference between forecast and actual loads and prices. In at least one embodiment, the processing logic may derive variables, such as a day of the week, time, month, location, etc., from observation timestamps. The processing logic may store any of the extracted and calculated features in a data storage.

At blocks 225, 230 and 235, the processing logic may train or retrain one or more models for predicting spike and price. The processing logic may perform any of blocks 225, 230 or 235. The processing logic may train a random forest model, for example.

A random forest model may include a bootstrap aggregated ensemble of decision trees. The processing logic may feed each decision tree with different data or different subsets of data from an overall data set. Each tree in the random forest model may yield a recommendation for a particular predicted value based on a terminal node of each observed decision tree. The recommendations from each decision tree may be considered and may be used to generate an output, which may be a spike. By using a random forest model, bias in prediction estimates may be reduced by increasing a number of leafs, levels, or splits for each decision tree. The processing logic may tune (e.g., train) the decision trees to reduce errors in model prediction.

Random forest modeling may reduce the error due to variance in the data by using input from a greater number of trees to make the model prediction. In addition, with bootstrap aggregated (e.g., "bagging"), the processing logic may train each tree on a subset of the data, instead of the entire dataset. Further, when making a prediction, each tree may consider a subset of the features when choosing which variable to make a split upon at that level. This ensures that the trees are varied individually as well as in the aggregate.

Random forest modeling may include a more flexible method than some regression-based methods because random forest modeling may rely upon discriminating splits, instead of relying on a simplifying mathematical structure (such as linearity in the data), to make predictions. Random forest modeling may thus be more useful to identify a probability of future spikes because a random forest model may identify patterns in the aggregate dataset without relying on clear mathematical trends in prices (which spikes may not follow).

To build the random forest model, the processing logic may select a split for each level of each individual decision tree based on which feature and corresponding value most increases a dissimilarity between two groups of data that are created by splitting on that feature and corresponding value.

An example random forest algorithm, as described in T. Hastie, R. Tibshirani, J. Friedman. *The Elements of Statistical Learning* ($2^{nd}$ ed.). New York: Springer Series in Statistics, 2009. Web. October 2015, and incorporated in this disclosure in its entirety, may be as follows:

1. For b=1 to B:
   (a) Draw a bootstrap sample Z* of size N from the training data.
   (b) Grow a random-forest tree $T_b$ to the boostrapped data, by recursively repeating the following steps for each terminal node of the tree, until the minimum node size $n_{min}$ is reached.
      (i) Select m variables at random from the p variables.
      (ii) Pick the best variable/split-point among the m.
      (iii) Split the node into two daughter nodes.
2. Output the ensemble of trees $\{Tb\}_1^B$.

To make a prediction at a new point x:

$$\text{Regression: } \hat{f}_{rf}^B(x) = \frac{1}{B}\sum_{b=1}^{B} T_b(x)$$

Classification: Let $\hat{C}_b(x)$ be the class prediction of the bth random-forest tree. Then $\hat{C}_{rf}^B$=majority vote $\{\hat{C}_b(x)\}_1^B$.

Parameters that the processing logic may use to tune the model and optimize performance include a number of features considered at each level to define a split, a minimum number of observations in each terminal node of a tree, a number of trees total in the ensemble, among others.

At block 225, the processing logic may train a five-minute spike prediction model which may be used to provide forecasting of price spike likelihood for each five-minute interval within an hour. In at least one embodiment, the five-minute non-spike price prediction model may be used to predict a price spike approximately three hours ahead of the first five-minute interval. In at least one embodiment, the processing logic may train a five-minute non-spike prediction model which may be used to provide forecasting of non-spike price for each five-minute interval within an hour. In at least one embodiment, the five-minute non-spike price prediction model may be used to predict a non-spike price approximately three hours ahead of the first five-minute interval.

At block 230, the processing logic may train an hourly spike prediction model which may be used to provide forecasting of price spike likelihood on an hourly level of granularity. In at least one embodiment, the hourly spike prediction model may be used to predict an hourly price spike approximately three hours ahead of the first hour.

At block 235, the processing logic may train a quantile regression model on the dataset of features. In at least one embodiment, the processing logic may train a quantile regression model with a real-time price as a predicted value. In at least one embodiment, the processing logic may train the model on a complete dataset, or a dataset of non-spike prices.

A quantile regression model may provide a model to predict a target variable while assuming that the target variable falls within each of the quantile ranges. As described in R. Koenker, K. Hallock. "Quantile Regression." *Journal of Economic Perspectives*, Vol. 15, No. 4 (2001): 143-156, which is incorporated in this disclosure in its entirety, a quantile function may be found by solving the following optimization problem:

$$\hat{\beta}(\tau) = \mathrm{argmin}_{\beta \in \mathfrak{R}_p} \Sigma \rho_\tau(\gamma_i - x'\beta),$$

where $\rho_\tau(u) = u(\tau - I(u<0))$, the piecewise linear "check function."

A parameter that may be used to tune a quantile regression model and optimize performance may include a quantile chosen to define models over, which may determine $\rho_\tau(u)$. Another parameter that may be used to tune a quantile regression model and optimize performance may include an optimization strategy chosen to solve the optimization function and fit the quantile regression models.

In at least one embodiment, the processing logic may identify how likely each quantile prediction is for a given observation given the quantile regression models and each of their resulting predicted values output. A prediction from the random forest model may be used for this purpose, as further described in conjunction with FIGS. 3 and 4.

At block 240, the processing logic may obtain point-of-prediction feature values. The point-of-prediction feature values may be features that may pertain to a prediction to be made. For example, the processing logic may receive a request to predict spike and/or price for a particular time and location. The processing logic may obtain point-of-prediction feature values to be used to predict spike and/or price for the particular time and location as indicated in the request.

At block 245, the processing logic may predict a price spike. To predict the price spike, the processing logic may use any of the models of blocks 225, 230 and 235. Various methods for predicting a price spike are further described in conjunction with FIGS. 3-4.

FIG. 3 illustrates a flow diagram of another example method 300 of forecasting a spike price of a commodity. The method 300 may begin at block 305, where processing logic may obtain a predicted probability of a spike from a random forest model output. In at least one embodiment, the random forest model may include a five-minute or hourly random forest model, as further described in conjunction with FIGS. 1 and 2. In at least one embodiment, the processing logic may obtain the predicted probability of a spike from a random forest model output based on point-of-prediction feature values.

At block 310, the processing logic may determine whether the predicted probability of the spike is greater than a risk tolerance. The risk tolerance may include the spike risk tolerance and spike price threshold information 104 of FIG. 1. The processing logic may compare the predicted spike probability with the risk tolerance to determine whether to warn a user of a possible spike. When the predicted probability of the spike is greater than the risk tolerance (e.g., "YES" at block 310), the processing logic may determine that a spike is predicted and may modify a trading strategy. In at least one embodiment, the processing logic may send a message to a user indicative of the predicted spike. In at least one embodiment, when detecting a possible spike, the processing logic may refrain from predicting a spike price. In at least one alternative embodiment, when detecting a possible spike, the processing logic may predict a spike price.

When the predicted probability of the spike is less than the risk tolerance (e.g., "NO" at block 310), the processing logic may use the predicted probability of the spike in a quantile regression model. In at least one embodiment, the processing logic may use random forest probability to predict a non-spike price. For example, the processing logic may perform parameterized weighting of quantile regression estimates with random forest prediction. When a target variable is distributed normally, the processing logic may obtain the probability that each quantile model is optimal from a normal distribution and its density function. In at least one embodiment, the processing logic may predict the probability that each quantile model applies to an observation using the predicted probability of the spike obtained from a random forest model, as further described in conjunction with FIG. 2. The processing logic may use the random forest prediction to inform the extent to which a Gaussian, or exponential, weighting function may be used over the quantile regression estimates. The random forest spike probability may inform a weighting function that may be used to augment the prediction from each quantile in the quantile regression, and develop probabilistic estimates for the extent to which each quantile model may apply to an observation. An example equation for the predicted price may include:

$$\widetilde{price} = f(\widetilde{RF}) \times \left[ \sum_z^{quantities} (\lambda e^{(-\lambda(\alpha - f(x)))} \cdot \widetilde{Q_x}) \right] +$$

$$f(1 - \widetilde{RF}) \times \left[ \sum_z^{quantities} \left( \frac{1}{\sigma\sqrt{2\pi}} e^{\frac{-(j(x)-\mu)^2}{2\sigma^2}} \cdot \widetilde{Q_x} \right) \right]$$

where f is a piecewise or monotonically increasing function, $\widetilde{RF}$ is the predicted probability of spike from the random forest model, $\hat{Q}_x$ is the predicted price value from the quantile x model, x is the quantile number, and $\mu$, $\sigma$, $\lambda$, $\alpha$, are tuned constants.

The weighting function and model inputs may yield one predicted price when the quantile regression point estimates are weighted according to the above equation. When taking the weighting applied to each individual quantile estimate, the predicted probability may also include the following equation:

$$\frac{\text{weight of specific quantile prediction}}{\text{sum of quantile weights}},$$

where the specific quantile prediction may be accurate for a given observation.

Quantile regression may provide several models which may apply to an observation. The random forest probability may indicate how to weight each of these quantile models in order to provide a point or probabilistic price prediction.

At block 325, the processing logic may obtain a probabilistic or point non-spike price prediction based on the weighted quantile regression estimates. In at least one embodiment, to predict a non-spike probabilistic price estimate, the processing logic may use the random forest predicted probability to parameterize the weighting function over the quantile estimates from quantile regression.

FIG. 4 illustrates a flow diagram of a further example method 400 of forecasting a spike price of a commodity. The method 400 for point and probabilistic price prediction may use probability predictions from a random forest model trained to predict the probability that each quantile estimate applies to an observation. The method 400 may begin at block 405, where processing logic may obtain quantile model estimates for one or more training observations. The training observations may be taken as part of the training as further described in conjunction with FIG. 2.

At block 410, the processing logic may calculate which quantile model estimate may be closest for each observation. At block 415, the processing logic may train a random forest model on the resulting dataset of features, with the closest quantile model as the predicted value. The processing logic may predict the probability that each quantile model applies to an observation using the probability that a specific quantile estimate is best according to a random forest model. The random forest model may provide probabilities for a probabilistic estimate of the price, as well as a weight to apply to each quantile model estimate to obtain one point price prediction.

At block 420, the processing logic may provide the point-of-prediction feature values into the quantile regression models. The processing logic may obtain a price estimate from each quantile regression model based on the point-of-prediction feature values provided to the quantile regression models.

At block 425, the processing logic may obtain a probability that each quantile estimate may apply from the random forest model. At block 430, the processing logic may obtain an estimate and probability for probabilistic price forecasting. In some alternative embodiments, the processing logic may multiply and/or sum the probability that each quantile estimate may apply from the random forest model and the price estimate from each quantile regression model to obtain a predicted price. An example equation for the predicted price may include:

$$\widehat{price} = \sum_{x}^{quantile-models} (\widehat{RF_x} \cdot \widehat{Q_x})$$

where $\widehat{RF}$ is the predicted probability that each quantile model applies (from the random forest model), $\widehat{Q}_x$ is the predicted price value from the quantile x model, and x is the quantile number.

At block 435, the processing logic may report a spike when the predicted price is above a price spike threshold or may report a non-spike when the predicted price is below a price spike threshold.

Figure 5A:
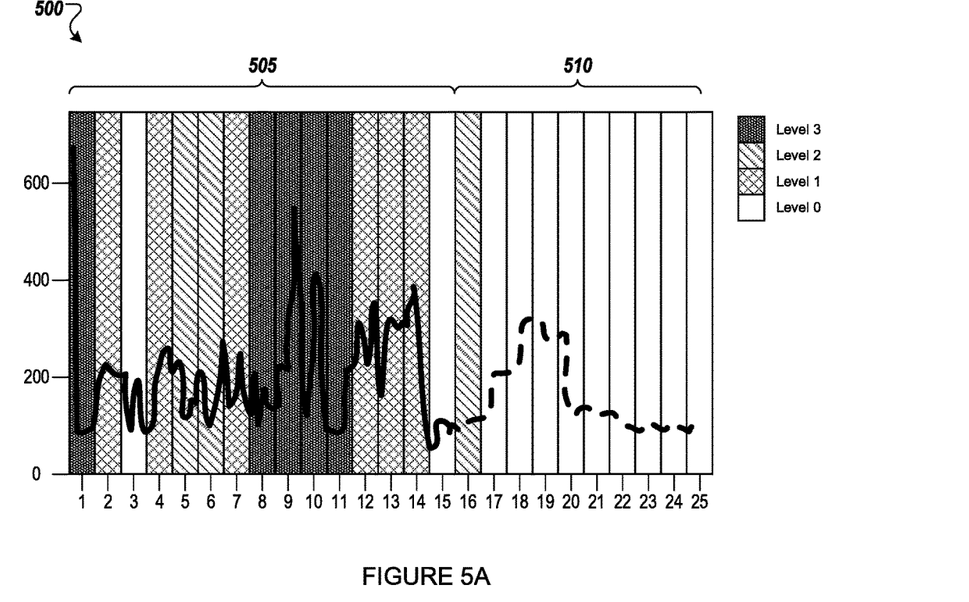
FIG. 5A illustrates an example visualization output of an actual past price and a one-hour-ahead price prediction.
Figure 5B:
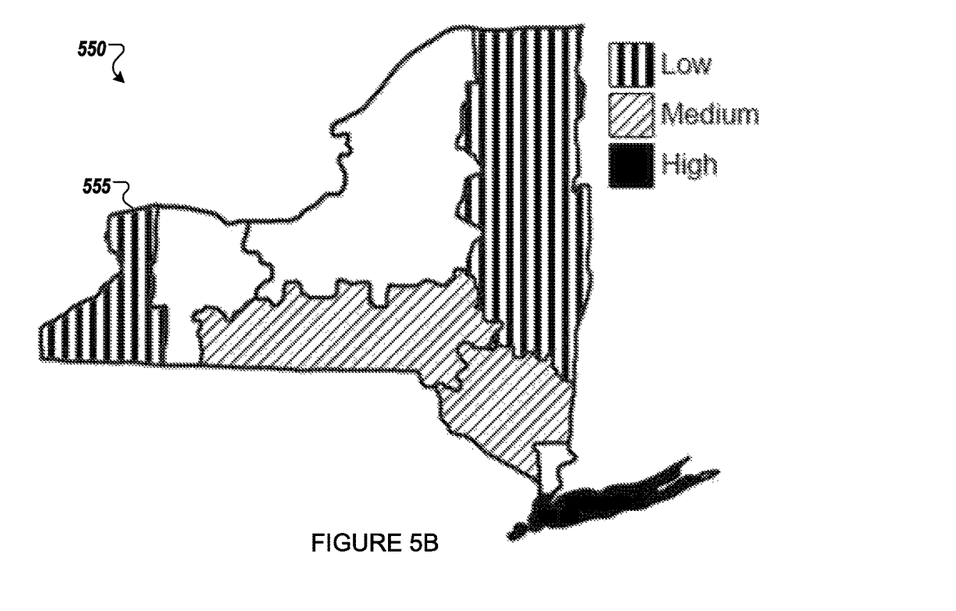
FIG. 5B illustrates an example visualization output of a location-specific forecast of price spike likelihood.

FIGS. 5A and 5B illustrate various example visualization outputs of predicted spike and price. FIG. 5A illustrates an example visualization output 500 of an actual past price (illustrated as a black line and by region 505) for one day and a one-hour-ahead price prediction, which is illustrated as the dotted line and also indicated in region 510. A prediction of a probability of a spike is illustrated as different fill patterns to indicate different probability ranges: Level 0, Level 1, Level 2, and Level 3. As illustrated, a probability of a spike increases with each level such that Level 0 indicates a lower spike probability and Level 3 indicates a higher spike probability.

FIG. 5B illustrates another example visualization output 550 of a location-specific forecast of price spike likelihood. As illustrated, the visualization output 550 includes a geographic region 555 that is divided into subdivisions. The price spike likelihood is illustrated as different fill patterns to indicate different probability ranges: Low, Medium, and High. As illustrated, a probability of a probability of a spike increases with each level such that Low indicates a lower spike probability and High indicates a higher spike probability.

Figure 6:
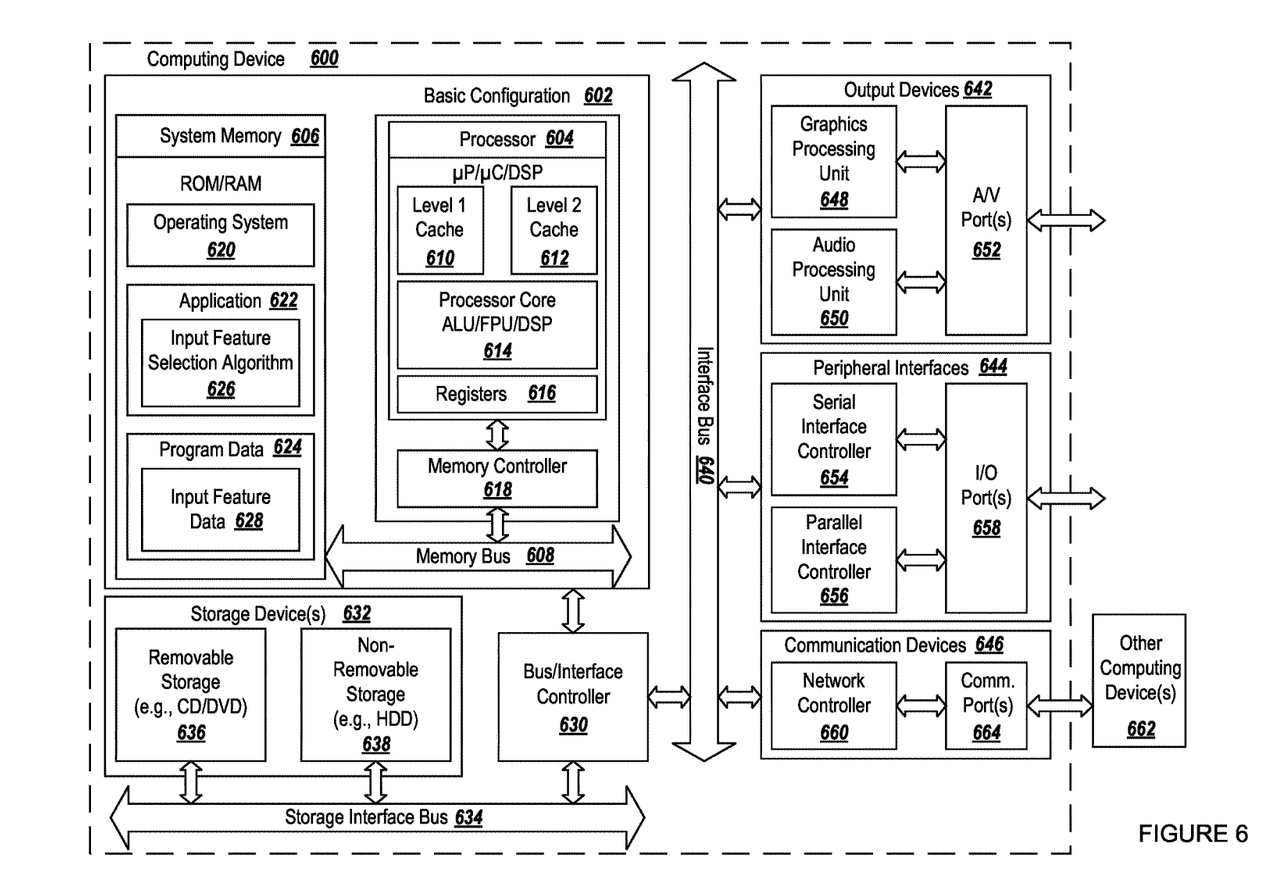
FIG. 6 is a block diagram illustrating an example computing device that is arranged for probabilistic price and spike forecasting, all arranged in accordance with at least one embodiment described herein.

FIG. 6 is a block diagram illustrating an example computing device 600 that is arranged for probabilistic price and spike forecasting, arranged in accordance with at least one embodiment described herein. In a basic configuration 602, the computing device 600 typically includes one or more processors 604 and a system memory 606. A memory bus 608 may be used to communicate between the processor 604 and the system memory 606.

Depending on the desired configuration, the processor 604 may be of any type including, but not limited to, a microprocessor (µP), a microcontroller (µC), a digital signal processor (DSP), or any combination thereof. The processor 604 may include one or more levels of caching, such as a level one cache 610 and a level two cache 612, a processor core 614, and registers 616. The processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including, but not limited to, volatile memory (such as RAM), nonvolatile memory (such as ROM, flash memory, etc.), or any combination thereof. The system memory 606 may include an operating system 620, one or more applications 622, and program data 624. The application 622 may include an input feature selection algorithm 626 that is arranged to perform input feature selection as is described herein. The program data 624 may include input feature data 628 as is described herein, or other input feature data. In some embodiments, the application 622 may be arranged to operate with the program data 624 on the operating system 620 such that the methods 200, 300, and 400 of FIGS. 2, 3, and 4, respectively, may be provided as described herein.

The computing device 600 may have additional features or functionality, and additional interfaces to facilitate communications between the basic configuration 602 and any involved devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 606, the removable storage devices 636, and the non-removable storage devices 638 are examples of computer storage media or non-transitory computer-readable medium or media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by the computing device 600. Any such computer storage media or non-transitory computer-readable media may be part of the computing device 600.

The computing device 600 may also include an interface bus 640 to facilitate communication from various interface devices (e.g., output devices 642, peripheral interfaces 644, and communication devices 646) to the basic configuration 602 via the bus/interface controller 630. The output devices 642 include a graphics processing unit 648 and an audio processing unit 650, which may be configured to communicate to various external devices such as a display or speakers via one or more A/V ports 652. The peripheral interfaces 644 include a serial interface controller 654 or a parallel interface controller 656, which may be configured to communicate with external devices such as input devices (e.g., keyboard, mouse, pen, voice input device, touch input device, etc.), sensors, or other peripheral devices (e.g., printer, scanner, etc.) via one or more I/O ports 658. The communication devices 646 include a network controller 660, which may be arranged to facilitate communications with one or more other computing devices 662 over a network communication link via one or more communication ports 664.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 600 may be implemented as a portion of a small-form factor portable (or mobile) electronic device such as a smartphone, a personal data assistant (PDA), or an application-specific device. The computing device 600 may also be implemented as a personal computer including both laptop computer and non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, various changes, substitutions, and alterations could be made hereto without departing from the spirit and scope of the invention.

What is claimed is:

1. A method comprising:
obtaining a request to perform a prediction of a spike in a price of a commodity, wherein the spike is a change to the price of the commodity above a threshold amount within a period of time;
obtaining additional information of the commodity from an external source based on the request;
training a first machine learning algorithm using the additional information of the commodity in view of a first set of initial training parameters, wherein the first machine learning algorithm is configured to generate a first spike prediction random forest model based on a first time interval and a second spike prediction random forest model based on a second time interval, wherein the first time interval and the second time interval are different;
training a second machine learning algorithm using the additional information of the commodity in view of a second set of initial training parameters, wherein the second machine learning algorithm is based on quantile regression and generates a quantile prediction that is based on a prediction from the first machine learning algorithm;
determining probability of the spike based at least in part on the additional information obtained from the external source, the first spike prediction random forest model, and the second spike prediction random forest model;
determining a spike price threshold and a stability numeric of the price of the commodity, based at least in part on the additional information obtain from the external source, wherein the spike price threshold is a variable value based in part on the stability numeric of the price of the commodity;
determining that the probability of the spike is below the risk tolerance and the price of the commodity is below the spike price threshold;
selecting the second machine learning algorithm in response to the probability of the spike being below the risk tolerance and the price of the commodity is below spike price threshold;
determining, using the second machine learning algorithm, a price prediction by
inputting the probability of the spike for the commodity into a quantile regression estimate weighting function to generate one or more quantile regression estimates;
performing parameterized weighting of the one or more quantile regression estimates using a random forest predicted probability to generate one or more weighted quantile regression estimates; and
selecting one weighted quantile regression estimate of the one or more weighted quantile regression estimates as a nonspike price prediction for the commodity; and outputting the nonspike price prediction for visual representation on the electronic display.

2. The method of claim 1, wherein the first and second machine learning algorithms are each different machine learning algorithms.

3. The method of claim 2, wherein the first time interval and the second time interval are based on time intervals of a commodity market of the commodity.

4. The method of claim 1 further comprising:
extracting one or more features from the additional information, wherein the first machine learning algorithm is trained based on the first set of initial training parameters and the extracted features.

5. The method of claim 4, wherein the first machine learning algorithm is periodically trained based on the extracted features or based on new features.

6. The method of claim 1, wherein the request includes a particular time and a location.

7. The method of claim 6, wherein the price prediction at the particular time is determined by applying spike price information to a plurality of decision trees in a random forest model, wherein the spike price is based on outputs of the plurality of decision trees in the random forest model.

8. The method of claim 7, wherein the price prediction at the particular time is a mean of the outputs of the plurality of decision trees in the random forest model.

9. The method of claim 7, wherein the plurality of decision trees in the random forest model are generated using a plurality of features based on load information of the commodity and previous price information of the commodity, wherein each of the plurality of decision trees in the random forest model is constructed using a subset of the plurality of features, wherein a first subset of the plurality of features used to generate a first of the plurality of decision trees in the random forest model is different from a second subset of the plurality of features used to generate a second of the decision trees in the random forest model.

10. A non-transitory computer readable medium that include instructions that when executed by one or more processors perform operations to forecast spike in price of a commodity, the operations comprising:
obtaining a request to perform a prediction of a spike in a price of a commodity, wherein the spike is a change to the price of the commodity above a threshold amount within a period of time;
obtaining additional information of the commodity based on the request, wherein the additional information is at least one of a spike feature, a load feature, a comparison load feature, a seasonal feature, a type of day feature, an hourly price variance feature, a price data feature, a spike series length feature, a demand price ratio feature, and an elastic feature;
training a first machine learning algorithm using the additional information of the commodity in view of a first set of initial training parameters, wherein the first machine learning algorithm is configured to generate a first spike prediction random forest model based on a first time interval and a second spike prediction random forest model based on a second time interval, wherein the first time interval and the second time interval are different;
training a second machine learning algorithm using the additional information of the commodity in view of a second set of initial training parameters, wherein the second machine learning algorithm is based on quantile regression and generates a quantile prediction that is based on a prediction from the first machine learning algorithm;
determining a probability of the spike based at least in part on the additional information, the first spike prediction random forest model, and the second spike prediction random forest model;
determining that the probability of the spike is below the risk tolerance;
selecting the second machine learning algorithm in response to the probability of the spike being below the risk tolerance;

determining, using the second machine learning algorithm, a price prediction by
inputting the probability of the spike for the commodity into a quantile regression estimate weighting function to generate one or more quantile regression estimates;
performing parameterized weighting of the one or more quantile regression estimates using a random forest predicted probability to generate one or more weighted quantile regression estimates; and
selecting one weighted quantile regression estimate of the one or more weighted quantile regression estimates as a nonspike price prediction for the commodity; and outputting the nonspike price prediction for visual representation on the electronic display.

11. The non-transitory computer readable medium of claim 10, wherein the first time interval and the second time interval are based on time intervals of a commodity market of the commodity.

12. The non-transitory computer readable medium of claim 10, wherein the request includes a particular time, wherein a non-spike price at the particular time is determined without using spike price information and the spike price at the particular time is determined without using the non-spike price information.

13. The non-transitory computer readable medium of claim 10, wherein the operations further comprise:
extracting one or more features from the additional information, wherein the first machine learning algorithm is trained based on the first set of initial training parameters and the extracted features.

14. The non-transitory computer readable medium of claim 10, wherein the request includes a particular time, and wherein a price prediction at the particular time is determined by applying spike price information to a plurality of decision trees in a random forest model, wherein the spike price is based on outputs of the plurality of decision trees in the random forest model.

15. A system comprising:
a memory; and
a processor operatively coupled to the memory, the processing being configured to:
obtain a request to perform a prediction of a spike in a price of a commodity, wherein the spike is a change to the price of the commodity above a threshold amount within a period of time;
obtain additional information of the commodity based on the request;
training a first machine learning algorithm using the additional information of the commodity in view of a first set of initial training parameters, wherein the first machine learning algorithm is configured to generate a first spike prediction random forest model based on a first time interval and a second spike prediction random forest model based on a second time interval, wherein the first time interval and the second time interval are different;
training a second machine learning algorithm using the additional information of the commodity in view of a second set of initial training parameters, wherein the second machine learning algorithm is based on quantile regression and generates a quantile prediction that is based on a prediction from the first machine learning algorithm;
determine a probability of the spike based at least in part on the additional information, the first spike prediction random forest model, and the second spike prediction random forest model;
determine a spike price threshold and a stability numeric of the price of the commodity, based at least in part on the additional information obtain from the external source, wherein the spike price threshold is a variable value based in part on the stability numeric of the price of the commodity;
determine that the probability of the spike is below the risk tolerance and the price of the commodity is below the spike price;
select the second machine learning algorithm in response to the probability of the spike being below the risk tolerance and the price of the commodity is below spike price threshold;
determine, using the second machine learning algorithm, a price prediction by
inputting the probability of the spike for the commodity into a quantile regression estimate weighting function to generate one or more weighted quantile regression estimates;
performing parameterized weighting of the one or more quantile regression estimates using a random forest predicted probability to generate one or more weighted quantile regression estimates; and
selecting one weighted quantile regression estimate of the one or more weighted quantile regression estimates as a nonspike price prediction for the commodity; and output the nonspike price prediction for visual representation on the electronic display.

16. The system of claim 15, wherein the first time interval and the second time interval are based on time intervals of a commodity market of the commodity.

17. The system of claim 15, wherein the request includes a particular time, wherein a non-spike price at the particular time is determined without using the spike price information and the spike price at the particular time is determined without using the non-spike price information.

18. The system of claim 15, wherein the processor is further configured to:
extract one or more features from the additional information, wherein the first machine learning algorithm is trained based on the first set of initial training parameters and the extracted features.

19. The system of claim 18, wherein the first machine learning algorithm is periodically trained based on the extracted features or based on new features.

20. The system of claim 15, wherein the request includes a particular time, and wherein a price prediction at the particular time is determined by applying spike price information to a plurality of decision trees in a random forest model, wherein the spike price is based on outputs of the plurality of decision trees in the random forest model.

* * * * *